Jan. 4, 1927.
R. E. GARDNER
COASTER
Filed Oct. 29, 1924
1,613,508
2 Sheets-Sheet 1
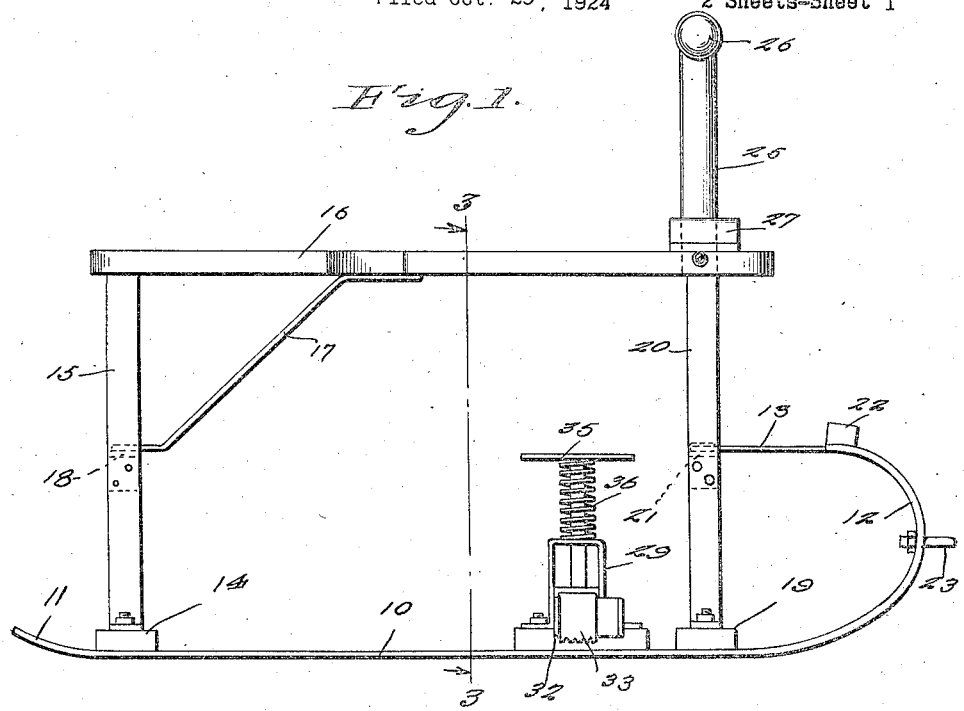
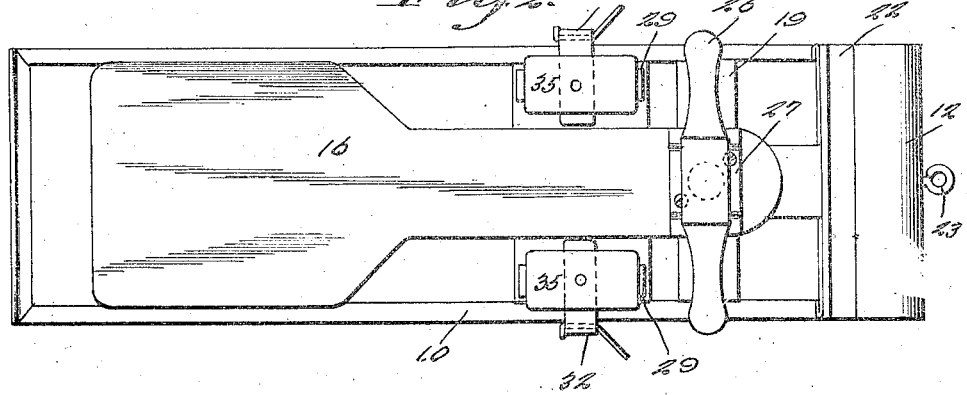

Jan. 4, 1927.
R. E. GARDNER
COASTER
Filed Oct. 29, 1924
1,613,508
2 Sheets-Sheet 2
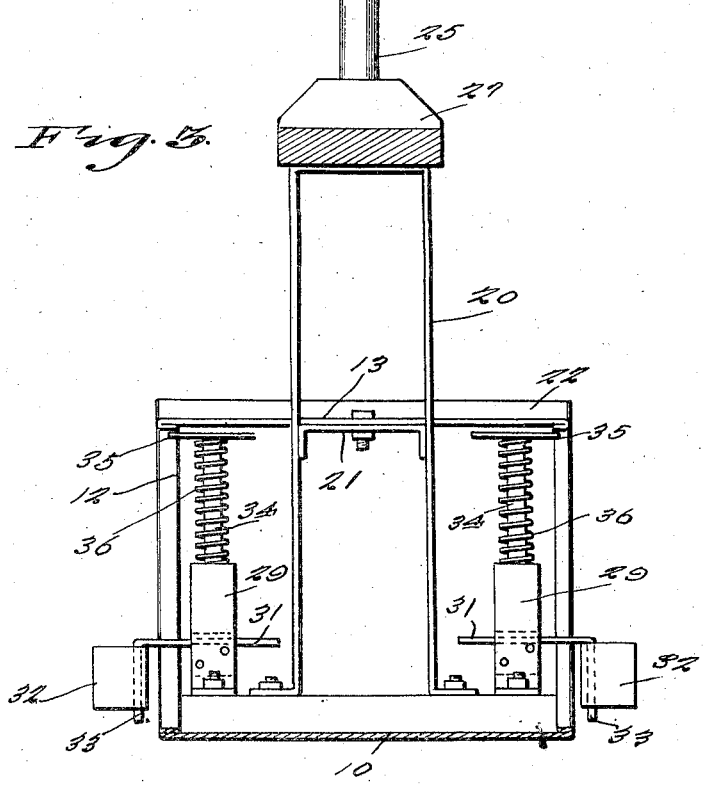
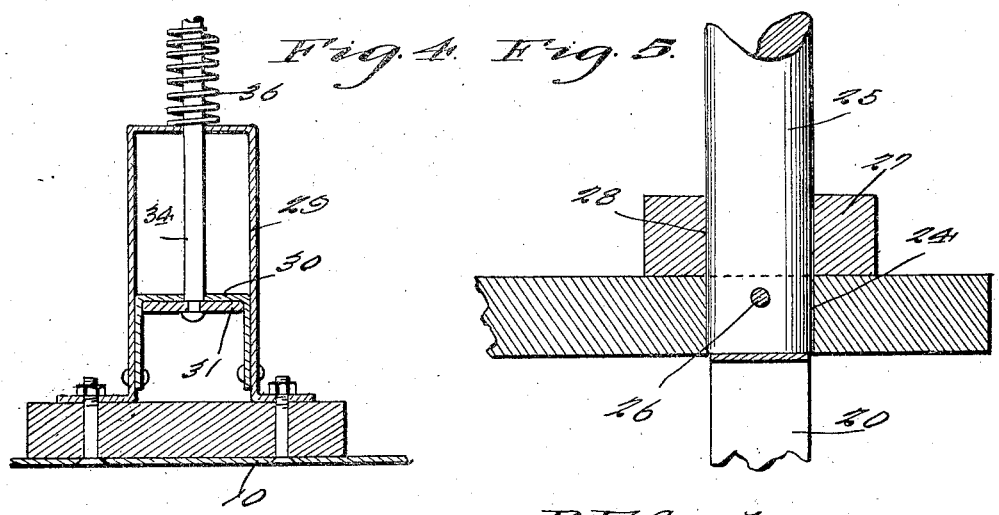

Patented Jan. 4, 1927.

1,613,508

UNITED STATES PATENT OFFICE.

RUTHERFORD E. GARDNER, OF NORTH BENNINGTON, VERMONT.

COASTER.

Application filed October 29, 1924. Serial No. 746,653.

This invention relates to toy vehicles, particularly to coasters, and has for its object the provision of a novel coaster or toboggan provided with a particular and novel form of steering and brake means whereby the direction of travel and whereby stopping may be easily effected and the device consequently rendered safe in use.

An important and more specific object is the provision of a coaster or sled device of such construction that the operator may sit thereon upon a suitable seat structure, in such position that the feet will rest always upon the combined steering and braking means so that the device may be kept constantly under control.

An additional object is the provision of a device of this character which will be simple and inexpensive in manufacture, easy to use, extremely attractive to children, efficient and durable in service, and a general improvement in the art.

With the above and other objects and advantages in view, the invention consists in the details of construction to be hereinafter more fully described and claimed, and illustrated in the accompanying drawings in which:

Figure 1 is a side elevation,

Figure 2 is a top plan view,

Figure 3 is a vertical cross section taken on the line 3—3 of Figure 1,

Figure 4 is a detail sectional view through one of the combined steering and brake devices showing only the lower portion thereof, and Figure 5 is a detail section showing the handle mounting.

Referring more particularly to the drawings, I have shown the device as comprising a runner 10 of considerable length and of any desired width, which runner has its rear end slightly curved upwardly as indicated at 11 and its forward end reflexly bent or extended as indicated at 12 to provide an extension 13 spaced considerably above the body portion of the runner. The runner is preferably of such width that only one will be needed though it is obvious that the device could be constructed with two runners if such should be found desirable for any reason whatsoever.

Secured to and extending transversely of the runner near the rear end thereof is a bar or cleat 14 upon which is secured the rear bolster 15 which is preferably of U shape and which forms a support for the rear end of the seat 16. A suitable brace 17 is secured to the under side of the seat and is further secured to a cross member 18 located within the U-shaped bolster 15. It might be mentioned, in passing, that if desired the side and end edges of the runner 10 may be turned over for the purpose of providing stiffening means and giving greater rigidity.

Secured to the forward portion of the runner and extending transversely thereof is a bar or cleat 19 upon which is secured an upstanding U-shaped bolster 20 within which is mounted a transverse element 21 to which is secured the rear end of the extension 13 of the runer. A foot rest 22 is secured to the extension 13 near the bend 12, and a suitable screw eye, eye bolt or the like 23 may be provided at the forward portion of the bend 12 in the runner for the purpose of attaching a tow rope or the like. The forward portion of the seat 16 is secured upon the top of the U-shaped forward bolster 20 as clearly indicated in Figures 1 and 3, and this forward portion of the seat is formed with a circular hole 24 within which is engaged the lower end of the handle 25 which preferably carries a cross piece 26. The handle is secured in place with respect to the seat by means of a transverse pin or bolt 26, and for reinforcing purposes, I may provide a block device 27 mounted upon the seat and formed with a hole 28 through which the handle 25 extends as clearly shown in Figure 5.

Secured upon the forward portion of the runner at opposite sides thereof are upstanding U-shaped brackets 29 within each of which is secured an inverted U-shaped stop member 30 beneath which is slidably mounted the shank portion 31 of an angular shoe 32 having a depending point 33 adapted to be engagtd with the surface of the snow or ice traveled over for the purpose of exerting a steering or braking action.

The shank portion 31 of each shoe member is secured to the lower end of a rod 34 which is slidable through the stop member 30 and through the top of the U-shaped bracket 29. At the top of the rod is a transverse abutment plate 35 against which engages the upper end of a coil spring 36 which surrounds the rod and which abuts at its lower end against the top of the U- shaped bracket 29. Ordinarily, the shoe members 32 and the points 33 thereof are held out of engagement with the surface traveled over owing to the provision of these springs 36. In the use of the device, the operator sits upon the seat 16, grasps the cross-piece 26 of the handle device and places his feet against the foot rest 32. The device will coast down hill in exactly the same manner as an ordinary sled. Whenever the rider intends to make a turn in one direction or the other, he places the proper foot upon the shoe member 32 and presses downwardly thereon so as to force the point 33 into engagement with the surface of the snow or ice traveled over. When this is done, it is apparent that one side will be retarded and this will naturally result in causing the device to travel in a circle or along a curve. In case it is desired to stop, it is merely necessary that the operator place both feet upon the shoe members 32 and force them downwardly against the resistance of the springs 36 so that a drag will be produced, which drag will cause the device to cease traveling. If for any reason it is preferred, it is obvious that pressure may be applied to the abutment plate 35 either by hand or by foot instead of applying pressure upon the top of the shoe members 32.

From the foregoing description and a study of the drawings it will be apparent that I have thus provided a simply constructed, inexpensive and very serviceable toy device for the purpose specified which will be extremely amusing and entertaining to the young. The provision of the brake device and steering means is very important inasmuch as it makes the device safe in use as it may be kept under control at all times.

While I have shown and described the device as constructed in a certain specified manner, it should be understood that the essential feature of the invention is the provision of the combined steering and braking means, which mechanism may be associated with a coaster constructed to have a single runner or a pair of runners, this detail being absolutely immaterial. It is likewise to be observed that the frame construction, mounting of the various parts and other details may be varied within wide limits and I furthermore reserve the rights to make all such changes in the form, construction and arrangement of parts as will not depart from the spirit of the invention or the scope of the claim hereunto appended.

Having thus described the invention, I claim:

In a sled having a runner, combined steering and braking means comprising upstanding substantially inverted U-shaped bracket members located above the runner near the edges thereof, L-shaped arms having vertical and horizontal portions, the horizontal portions being slidably mounted within said brackets and the vertical portions extending downwardly in spaced relation to the side edges of the runner and being serrated, rearwardly converging wing members carried by the vertical arm portions of said L-shaped members, rods slidable through the top of the bracket and secured to said L-shaped members, pedal elements on the upper ends of said rods, and coil springs surrounding said rods between the brackets and the pedal elements, said pedal elements being selectively depressible to effect steering or simultaneously depressible to effect a braking action.

In testimony whereof I affix my signature.

RUTHERFORD E. GARDNER.